United States Patent
Furusato (10) Patent No.: US 9,720,142 B2
(45) Date of Patent: Aug. 1, 2017

(54) OPTICAL COMPONENT AND TIMEPIECE

(71) Applicant: SEIKO EPSON CORPORATION, Tokyo (JP)

(72) Inventor: Daiki Furusato, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/863,669

(22) Filed: Sep. 24, 2015

(65) Prior Publication Data

US 2016/0154143 A1    Jun. 2, 2016

(51) Int. Cl.
| B32B 15/04 | (2006.01) |
| B32B 17/06 | (2006.01) |
| G02B 1/116 | (2015.01) |
| G04B 39/00 | (2006.01) |

(52) U.S. Cl.
CPC .............. *G02B 1/116* (2013.01); *G04B 39/00* (2013.01)

(58) Field of Classification Search
USPC ....... 428/426, 428, 432, 688, 689, 697, 699, 428/701, 702
See application file for complete search history.

(56) References Cited

U.S. PATENT DOCUMENTS

| 4,940,636 A * | 7/1990 | Brock ................ C03C 17/3411 359/586 |
| 6,027,766 A * | 2/2000 | Greenberg ............ C03C 17/245 204/192.12 |
| 6,037,289 A * | 3/2000 | Chopin ................ B82Y 30/00 106/287.16 |
| 6,103,363 A * | 8/2000 | Boire .................... C03C 17/002 427/164 |
| 8,506,768 B2 | 8/2013 | Myli et al. |
| 2001/0031365 A1* | 10/2001 | Anderson ......... B32B 17/10036 428/432 |
| 2002/0012779 A1* | 1/2002 | Miyashita .............. B01J 35/002 428/216 |
| 2002/0102414 A1 | 8/2002 | Mitsuishi et al. |
| 2003/0027000 A1 | 2/2003 | Greenberg et al. |

(Continued)

FOREIGN PATENT DOCUMENTS

| DE | 196 36 970 A1 | 3/1998 |
| JP | 2005-114649 A | 4/2005 |

(Continued)

OTHER PUBLICATIONS

JP2011-149712 English machine translation.*

(Continued)

*Primary Examiner* — Lauren R Colgan
(74) *Attorney, Agent, or Firm* — Global IP Counselors, LLP (57) ABSTRACT

An optical component includes: a base material; and an antireflection film, which includes a titanium oxide layer composed mainly of titanium oxide and containing at least one element selected from the group consisting of Nb, Si, Zr, Ta, Al, and Hf as an accessory component, and a silicon oxide layer composed mainly of silicon oxide. The element as the accessory component is preferably an element which constitutes a composite oxide with titanium. The content of the accessory component in the titanium oxide layer is preferably 0.01 mass % or more and 1.0 mass % or less.

14 Claims, 2 Drawing Sheets

(56) References Cited

U.S. PATENT DOCUMENTS

| | | |
|---|---|---|
| 2003/0039843 A1* | 2/2003 | Johnson ................ C03C 17/002 428/432 |
| 2003/0054178 A1* | 3/2003 | Anzaki ................ B01J 35/002 428/432 |
| 2003/0064179 A1* | 4/2003 | Kijima ................ C03C 17/008 428/34.4 |
| 2007/0116966 A1 | 5/2007 | Mellott et al. |
| 2007/0218646 A1 | 9/2007 | Hitosugi et al. |
| 2007/0264494 A1* | 11/2007 | Krisko ................ B01J 35/004 428/336 |
| 2008/0159083 A1 | 7/2008 | Kawakami |
| 2010/0027383 A1 | 2/2010 | Suzuki et al. |
| 2010/0326817 A1 | 12/2010 | Myli et al. |
| 2011/0041726 A1 | 2/2011 | Robb et al. |
| 2014/0037988 A1 | 2/2014 | Ganjoo et al. |
| 2014/0233106 A1 | 8/2014 | Vergoehl et al. |

FOREIGN PATENT DOCUMENTS

| | | | |
|---|---|---|---|
| JP | 2010-037115 A | | 2/2010 |
| JP | 2011-149712 | * | 8/2011 |
| WO | 98/21610 A1 | | 5/1998 |
| WO | 2013/016369 A1 | | 1/2013 |

OTHER PUBLICATIONS

The Extended European Search Report for the corresponding European Application No. 15196469.9 dated May 3, 2016.
https://www.mindat.org/min-213.html.

\* cited by examiner

OPTICAL COMPONENT AND TIMEPIECE

BACKGROUND

1. Technical Field

The present invention relates to an optical component and a timepiece.

2. Related Art

In an optical component such as a cover glass for a timepiece, an antireflection film which prevents light reflection is provided for the purpose of enhancing visibility on an opposite surface side or the like.

In the related art, an optical component had a complicated configuration such that many layers are stacked on one another for obtaining a sufficient antireflection function (see, for example JP-A-2005-114649). However, according to such a configuration, a satisfactory antireflection function could not be obtained depending on the intended use or the like.

SUMMARY

An advantage of some aspects of the invention is to provide an optical component including an antireflection film having an excellent antireflection function, and also to provide a timepiece including the optical component.

Such an advantage is achieved by aspects of the invention described below.

An optical component according to an aspect of the invention includes: a base material; and an antireflection film, which includes a titanium oxide layer composed mainly of titanium oxide and containing at least one element selected from the group consisting of Nb, Si, Zr, Ta, Al, and Hf as an accessory component, and a silicon oxide layer composed mainly of silicon oxide.

According to this configuration, an optical component including an antireflection film having an excellent antireflection function can be provided.

In the optical component according to the aspect of the invention, it is preferable that the element as the accessory component is an element which constitutes a composite oxide with titanium.

According to this configuration, the occurrence of a defect in appearance such as color unevenness or the occurrence of a problem such as a decrease in adhesiveness between the base material and the antireflection film can be more effectively prevented.

In the optical component according to the aspect of the invention, it is preferable that the content of the accessory component in the titanium oxide layer is 0.01 mass % or more and 1.0 mass % or less.

According to this configuration, an antistatic function, an antifogging property, and the like can be made particularly excellent while making the light transmittance of the titanium oxide layer particularly high.

In the optical component according to the aspect of the invention, it is preferable that the thickness of the titanium oxide layer is 5 nm or more and 200 nm or less.

According to this configuration, the antireflection function can be made particularly excellent. Also, the durability, antistatic function, and the like of the optical component can be made particularly excellent.

In the optical component according to the aspect of the invention, it is preferable that the thickness of the silicon oxide layer is 15 nm or more and 300 nm or less.

According to this configuration, the antireflection function can be made particularly excellent. Also, the durability and the like of the optical component can be made particularly excellent.

In the optical component according to the aspect of the invention, it is preferable that the antireflection film is a stacked body including multiple layers of each of the titanium oxide layer and the silicon oxide layer.

According to this configuration, the antireflection function can be made particularly excellent.

In the optical component according to the aspect of the invention, it is preferable that the thickness of the antireflection film is 20 nm or more and 500 nm or less.

According to this configuration, the antireflection function can be made particularly excellent. Also, the durability, antistatic function, and the like of the optical component can be made particularly excellent.

In the optical component according to the aspect of the invention, it is preferable that the base material is composed of a material containing at least one member selected from the group consisting of a silicate glass, a sapphire, glass, and a plastic.

These substances have excellent transparency. Further, in the case where an antireflection film is provided on a base material composed of such a material, the antireflection function attributed to the antireflection film is more effectively exhibited. In addition, if the base material is composed of such a material, the adhesiveness between the base material and the antireflection film can be made particularly excellent, and thus, the durability and reliability of the optical component can be made particularly excellent.

It is preferable that the optical component according to the aspect of the invention is a cover glass for a timepiece.

By applying the aspect of the invention to a cover glass for a timepiece, the effect of the invention is more remarkably exhibited.

Further, the aesthetic appearance of the timepiece as a whole can be made particularly excellent.

A timepiece according to another aspect of the invention includes the optical component according to the aspect of the invention.

According to this configuration, a timepiece capable of favorably visually recognizing a state on a rear surface side of the optical component can be provided, and the aesthetic appearance (aestheticity) of the timepiece as a whole can be made excellent, and thus, the value as an ornament can be increased. Further, for example, the visibility of the time and the like can be improved, and thus, also the function (practicality) as a daily necessity becomes excellent.

According to the aspects of the invention, an optical component including an antireflection film having an excellent antireflection function can be provided, and also a timepiece including the optical component can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings.

Optical Component

First, an optical component according to the invention will be described.

First Embodiment

Figure 1:
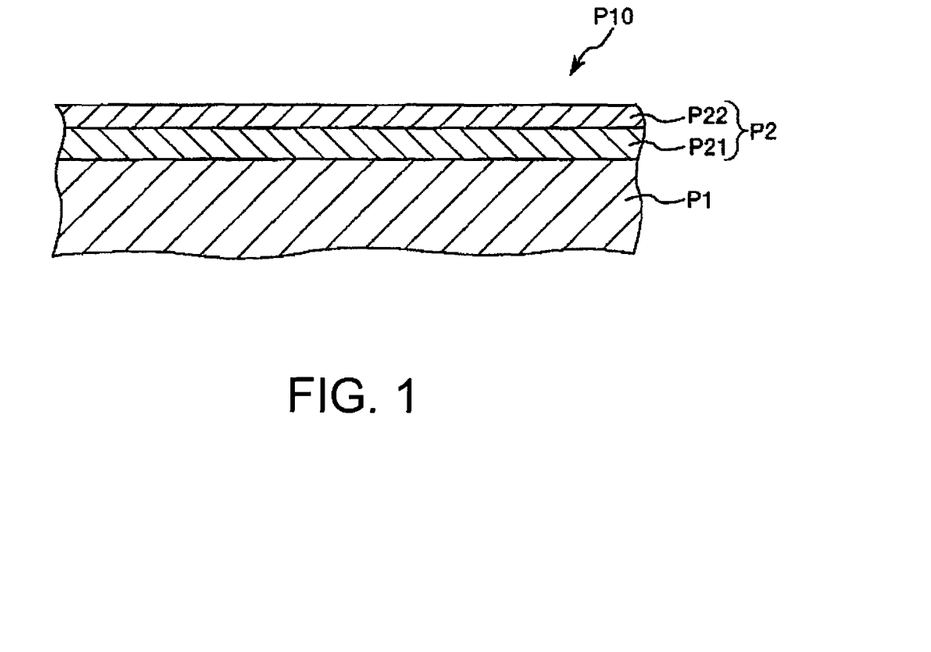
FIG. 1 is a cross-sectional view schematically showing a first embodiment of an optical component according to the invention.

FIG. 1 is a cross-sectional view schematically showing a first embodiment of an optical component according to the invention.

As shown in FIG. 1, an optical component P10 of this embodiment includes a base material P1 and an antireflection film P2.

The antireflection film P2 includes a titanium oxide layer P21 composed mainly of titanium oxide and containing at least one element selected from the group consisting of Nb, Si, Zr, Ta, Al, and Hf as an accessory component, and a silicon oxide layer P22 composed mainly of silicon oxide.

According to such a configuration, an excellent antireflection function is obtained while making the light transmittance and mechanical strength of the optical component P10 sufficiently excellent. Accordingly, the optical component P10 can stably exhibit a desired optical property.

The reason why such an excellent antireflection function is obtained is considered to be because the behavior of an incident light can be favorably controlled by using a material having sufficiently high light transmittance, and also providing the titanium oxide layer P21 having a relatively high refractive index and the silicon oxide layer P22 having a relatively low refractive index.

Further, since the titanium oxide layer P21 contains a given element (at least one element selected from the group consisting of Nb, Si, Zr, Ta, Al, and Hf) as an accessory component, the adhesiveness of the titanium oxide layer P21 to the silicon oxide layer P22 or the like is made excellent, and thus the durability and reliability of the optical component P10 can be made excellent. As a result, the optical property of the optical component P10 can be stably exhibited, and also the above-described effect and the like can be stably obtained.

In addition, according to the configuration as described above, an excellent antistatic function is exhibited. As a result, for example, adhesion of dirt such as dust due to static electricity can be prevented, and thus, the optical component P10 can stably exhibit the intrinsically possessed optical property.

Such an excellent effect is obtained by the factor that the titanium oxide layer P21 is composed mainly of titanium oxide and also by the factor that the titanium oxide layer P21 contains a given accessory component, and the excellent effect as described above is not obtained by the configuration devoid of either factor. That is, even if the optical component has a layer composed mainly of titanium oxide, a sufficient antistatic function is not obtained unless a given accessory component is contained in the layer. Further, even if the optical component has a layer containing a component listed above as the accessory component, a sufficient light transmittance and the like cannot be ensured unless the layer is composed mainly of titanium oxide, and therefore, the function as the optical component becomes significantly low.

Further, by including the titanium oxide layer P21 containing a given accessory component and also including the silicon oxide layer P22 as the outermost layer, the optical component P10 has an excellent antifogging property. As a result, a decrease in the optical property due to dew condensation or the like can be reliably prevented.

The reason why such an excellent antifogging property is obtained is considered to be because a hydrophilic group is exhibited on the surface of the silicon oxide layer P22 by the photocatalytic activity of titanium oxide or the like. Once this hydrophilic group is exhibited, this group is continued to be exhibited for a certain period of time. Therefore, for example, in the case where the optical component P10 is applied to a diver's watch, a sufficient antifogging property can be ensured while a diver is diving into water.

Further, in the related art, a resin film is sometimes used and provided on an optical component main body (base material). However, the related art has a problem that such a resin film has low abrasion resistance, and for example, when dirt adheres to the surface of the optical component, a wiping operation cannot be performed, and the like. On the other hand, the titanium oxide layer P21 as described above also has excellent abrasion resistance, and therefore, a wiping operation can also be favorably performed. Accordingly, the reliability of the optical component P10 can be further enhanced, and also the yield of the production of the optical component P10 can be improved.

Base Material

The base material P1 is generally a member which constitutes a main part of the optical component P10 and has light transmittance.

The refractive index of the base material P1 for a light with a wavelength of 589 nm is preferably 1.43 or more and 1.85 or less, more preferably 1.45 or more and 1.78 or less.

According to this, the optical property of the optical component P10 can be made particularly excellent.

The constituent material of the base material P1 is not particularly limited, and for example, various glasses, various plastics, and the like can be used. However, it is preferably a material containing at least one member selected from the group consisting of a silicate glass (a quartz glass or the like), a sapphire glass, and a plastic.

These substances have excellent transparency. Further, in the case where the antireflection film P2 is provided on the base material P1 composed of such a material, the antireflection function attributed to the antireflection film P2 is more effectively exhibited. In addition, when the base material P1 is composed of such a material, the adhesiveness between the base material P1 and the antireflection film P2 (the silicon oxide layer P22 and the titanium oxide layer P21) can be made particularly excellent, and thus, the durability and reliability of the optical component P10 can be made particularly excellent.

In particular, in the case where the base material P1 contains at least one of a silicate glass and a sapphire glass, excellent optical properties such as particularly excellent light transmittance and a moderate refractive index are obtained, and also the adhesiveness between the base material P1 and the antireflection film P2 is made particularly excellent, and thus, the durability of the optical component P10 as a whole can be made particularly excellent.

Examples of a plastic material constituting the base material P1 include various thermoplastic resins and various thermosetting resins, and specific examples thereof include polyolefins such as polyethylene, polypropylene, ethylene-propylene copolymers, and ethylene-vinyl acetate copolymers (EVA), cyclic polyolefins (COP), modified polyolefins, polyvinyl chloride, polyvinylidene chloride, polystyrene, polyamides (for example, nylon 6, nylon 46, nylon 66, nylon 610, nylon 612, nylon 11, nylon 12, nylon 6-12, and nylon 6-66), polyimides, polyamideimides, polycarbonate (PC), poly-(4-methylpentene-1), ionomers, acrylic resins, polymethyl methacrylate, acrylonitrile-butadiene-styrene copolymers (ABS resins), acrylonitrile-styrene copolymers (AS resins), butadiene-styrene copolymers, polyoxymethylene, polyvinyl alcohol (PVA), ethylene-vinyl alcohol copolymers (EVOH), polyesters such as polyethylene terephthalate (PET), polybutylene terephthalate (PBT), and polycyclohexane terephthalate (PCT), polyether, polyether ketone (PEK), polyether ether ketone (PEEK), polyether imide, polyacetal (POM), polyphenylene oxide, modified polyphenylene oxide, polysulfone, polyether sulfone, polyphenylene sulfide, polyarylate, aromatic polyesters (liquid crystal polymers), polytetrafluoroethylene, polyvinylidene fluoride, other fluororesins, various thermoplastic elastomers such as styrene-based, polyolefin-based, polyvinyl chloride-based, polyurethane-based, polyester-based, polyamide-based, polybutadiene-based, trans-polyisoprene-based, fluororubber-based, and chlorinated polyethylene-based elastomers, epoxy resins, phenolic resins, urea resins, melamine resins, unsaturated polyesters, silicone-based resins, urethane-based resins, poly-para-xylylene resins such as poly-para-xylylene, poly-monochloro-para-xylylene, poly-dichloro-para-xylylene, poly-monofluoro-para-xylylene, and poly-monoethyl-para-xylylene, and also include copolymers, blends, and polymer alloys composed mainly of these materials. Among these, one type or two or more types in combination (for example, as a blend resin, a polymer alloy, a stacked body, or the like) can be used.

Antireflection Film

The antireflection film P2 includes the titanium oxide layer P21 and the silicon oxide layer P22.

Titanium Oxide Layer

The titanium oxide layer P21 is composed mainly of titanium oxide and contains at least one element selected from the group consisting of Nb, Si, Zr, Ta, Al, and Hf as an accessory component.

The content of titanium (Ti) in the titanium oxide layer P21 is preferably 45 mass % or more and 75 mass % or less, more preferably 50 mass % or more and 70 mass % or less.

According to this, the refractive index of the titanium oxide layer P21 can be more reliably made favorable, and the antireflection function can be made particularly excellent. Further, while making the light transmittance of the titanium oxide layer P21 particularly high, the antistatic function, antifogging property, and the like can be made particularly excellent.

The content of oxygen (O) in the titanium oxide layer P21 is preferably 25 mass or more and 55 mass % or less, more preferably 30 mass % or more and 50 mass % or less.

The content of an element as the accessory component (in the case where multiple types of elements are contained, the sum of the contents of these elements) in the titanium oxide layer P21 is preferably 0.01 mass % or more and 1.0 mass % or less, more preferably 0.05 mass % or more and 0.9 mass % or less.

According to this, while making the light transmittance of the titanium oxide layer P21 particularly high, the antistatic function, antifogging property, and the like can be made particularly excellent.

The element as the accessory component may be contained in any form in the titanium oxide layer P21, however, it is preferably an element which constitutes a composite oxide with titanium.

According to this, the occurrence of a defect in appearance such as color unevenness or the occurrence of a problem such as a decrease in adhesiveness between the base material P1 and the antireflection film P2 can be more effectively prevented.

The accessory component to be contained in the titanium oxide layer P21 may be any as long as it is at least one element selected from the group consisting of Nb, Si, Zr, Ta, Al, and Hf, but is particularly preferably Nb.

According to this, the refractive index of the titanium oxide layer P21 can be more reliably made favorable, and the antireflection function can be made particularly excellent. In addition, both of the light transmittance and the antistatic function can be achieved at higher levels. Further, the adhesiveness to the silicon oxide layer P22 or the like can be made particularly excellent, and thus, the durability and reliability of the optical component P10 can be made particularly excellent.

In the case where Nb is contained in the titanium oxide layer P21 as the accessory component, the content of Nb in the titanium oxide layer P21 is preferably 0.01 mass % or more and 1.0 mass % or less, more preferably 0.05 mass % or more and 0.8 mass % or less.

According to this, the effect as described above is more remarkably exhibited.

The content ratio of Nb to the entire accessory components to be contained in the titanium oxide layer P21 is preferably 50 mass % or more, more preferably 60 mass % or more.

According to this, the effect as described above is more remarkably exhibited.

The titanium oxide layer P21 may contain a component other than the above-described components. Examples of such a component include a component which is used for a transparent electrode such as In and Sn.

The thickness of the titanium oxide layer P21 is preferably 5 nm or more and 200 nm or less, more preferably 7 nm or more and 150 nm or less.

According to this, the antireflection function can be made particularly excellent. Further, the durability, antistatic function, and the like of the optical component P10 can be made particularly excellent.

Silicon Oxide Layer

The silicon oxide layer P22 is composed mainly of silicon oxide.

By including such a silicon oxide layer P22 along with the above-described titanium oxide layer P21, an excellent antireflection function is obtained. Further, by disposing the silicon oxide layer P22 on the outermost surface, an excellent antifogging property can be obtained.

The silicon oxide layer P22 may be any as long as it is composed of a material containing silicon oxide, and the form of silicon oxide in the silicon oxide layer P22 may be any. For example, the silicon oxide layer P22 may be composed of silicon oxide in the form of a dense layer, or may be composed of deposited multiple silicon oxide (silica) particles.

The silicon oxide layer P22 composed of silicon oxide in the form of a dense layer can be favorably formed by using, for example, a gas-phase deposition method. The above-described titanium oxide layer P21 can be favorably formed by a gas-phase deposition method as described in detail later, and therefore, in the case where the silicon oxide layer P22 is formed by a gas-phase deposition method, the formation of the silicon oxide layer P22 and the formation of the titanium oxide layer P21 can be favorably performed continuously, and thus, the productivity of the optical component P10 can be made excellent.

Further, the silicon oxide layer P22 composed of deposited multiple silicon oxide (silica) particles can be favorably formed by using, for example, a composition containing silica particles.

When the silicon oxide layer P22 is composed of deposited multiple silica particles, the antireflection function of the antireflection film P2 as a whole can be made particularly excellent.

This is because in the silicon oxide layer P22, voids (air layers (refractive index: 1.00)) are present along with a region occupied by silica particles (refractive index: 1.46), so that the refractive index is decreased as compared with silica in the bulk form, and as a result, a favorable optical interference effect is obtained.

The thickness of the silicon oxide layer P22 is preferably 15 nm or more and 300 nm or less, more preferably 20 nm or more and 280 nm or less.

According to this, the antireflection function can be made particularly excellent. Further, the durability of the optical component P10 can be made particularly excellent. In addition, in the case where the silicon oxide layer P22 includes conductive particles, the antistatic function and the like of the optical component P10 as a whole can be made particularly excellent.

The thickness of the antireflection film P2 is preferably 20 nm or more and 500 nm or less, more preferably 27 nm or more and 380 nm or less.

According to this, the antireflection function can be made particularly excellent. Further, the durability, antistatic function, and the like of the optical component P10 can be made particularly excellent.

Examples of the optical component include various lenses (including microlenses, lenticular lenses, fresnel lenses, and the like) such as projector lenses, camera lenses, and eyeglass lenses, filters (camera low-pass filters, edge filters, UV cut filters, IR cut filters, and the like), light transmitting plates, dust-proof glasses, radiator plates, cover glasses for a timepiece, rear lids for a timepiece, and light transmitting dial plates (for example, dial plates for a solar timepiece).

Among these, the optical component is preferably a cover glass for a timepiece.

The cover glass is present at a place close to the viewpoint of an observer (a user or the like) at the time of using a timepiece, and also, on a rear surface side of the cover glass, time-displaying members such as a dial plate and hands are generally disposed, and therefore, the cover glass (optical component) is a member which is strongly required to have visibility of a dial plate and the like through the cover glass. Further, the cover glass is a member in which a problem of decreasing the visibility particularly remarkably occurs when dirt such as dust adheres to the cover glass due to static electricity. Further, in the case where the cover glass is undesirably charged with electricity, due to the effect, the hands such as an hour hand may be deformed, and therefore, a breakdown or the like of the timepiece may be caused due to such deformation. On the other hand, in the case where the invention is applied to a cover glass for a timepiece, the occurrence of the problem as described above can be effectively prevented. In light of this, by applying the invention to a cover glass for a timepiece, the effect of the invention is more remarkably exhibited.

Further, the cover glass is a component which has many opportunities to be visually recognized by an observer (a user or the like), and has a large influence on the appearance of the entire timepiece. In the invention, a high antireflection function is exhibited, and therefore, the excellent appearance (aestheticity) intrinsically possessed by an ornamental component such as a dial plate which is visually recognized through the cover glass can be effectively exhibited. Therefore, by applying the invention to a cover glass for a timepiece, the aesthetic appearance of the timepiece as a whole can be made particularly excellent.

In the case of a diver's watch or the like, the visibility through the cover glass sometimes largely affects the safety of an observer (user), however, according to the invention, a high antireflection function is exhibited, and therefore, also in an optical component for a timepiece to be used in such a severe environment, the effect as described above can be reliably exhibited.

Further, in a diver's watch or the like, liquid tightness in a case is maintained, however, a humidity contained in the case when assembling the watch is dew-condensed during use to cause a problem of decreasing the visibility in some cases. However, according to the invention, the antireflection film has a high antireflection function and also has a high antifogging property, and therefore, for example, in a diver's watch, by disposing a cover glass (optical component), to which the invention is applied, such that a surface provided with the antireflection film faces the inner surface side, the problem of dew condensation as described above can be more reliably prevented.

Second Embodiment

Figure 2:
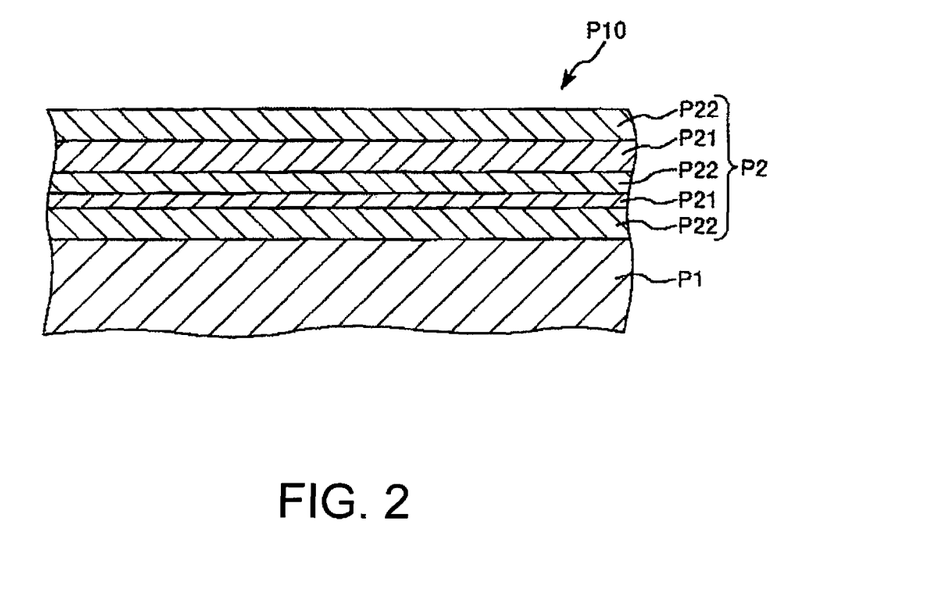
FIG. 2 is a cross-sectional view schematically showing a second embodiment of an optical component according to the invention.

FIG. 2 is a cross-sectional view schematically showing a second embodiment of the optical component according to the invention. In the following description, different points from the above embodiment will be mainly described, and the description of the same matter will be omitted.

As shown in FIG. 2, an optical component P10 of this embodiment includes a base material P1 and an antireflection film P2, however, the configuration of the antireflection film P2 is different from that of the first embodiment described above. That is, in this embodiment, the antireflection film P2 includes multiple titanium oxide layers P21 and multiple silicon oxide layers P22, and has a structure in which these layers are alternately disposed.

In this manner, in the invention, the antireflection film may have two or more layers of at least one of the titanium oxide layer and the silicon oxide layer.

According to this, the antireflection function can be made particularly excellent.

In particular, such an effect is more remarkably exhibited in the case where multiple layers of each of the titanium oxide layer P21 and the silicon oxide layer P22 are provided as this embodiment.

The multiple titanium oxide layers P21 constituting the antireflection film P2 may have the same conditions such as a thickness and a composition, but may have different conditions. Similarly, the multiple silicon oxide layers P22 constituting the antireflection film P2 may have the same conditions such as a thickness and a composition, but may have different conditions.

In the configuration shown in FIG. 2, the antireflection film P2 includes two titanium oxide layers P21 and three silicon oxide layers P22, however, the layer numbers of the titanium oxide layers P21 and the silicon oxide layers P22 constituting the antireflection film P2 are not particularly limited.

In the case where the layer number of the titanium oxide layers P21 and the layer number of the silicon oxide layers P22 constituting the antireflection film P2 are each 2 or more and 9 or less, the above-described effect is more remarkably exhibited, and also the optical component P10 can be produced with higher productivity. Further, the durability, light transmittance, and the like of the optical component P10 can be made particularly excellent.

Further, as this embodiment, in the case where the antireflection film P2 includes multiple layers of at least one of the titanium oxide layer P21 and the silicon oxide layer P22, the thickness of the antireflection film P2 is preferably 20 nm or more and 500 nm or less, more preferably 27 nm or more and 380 nm or less.

According to this, the antireflection function can be made particularly excellent. Further, the durability, antistatic function, and the like of the optical component P10 can be made particularly excellent.

Method for Producing Optical Component

Next, a method for producing the optical component will be described.

The optical component P10 may be produced by any method, however, a production method of this embodiment includes a base material preparation step (1a) of preparing abase material P1, a titanium oxide layer formation step (1b) of forming a titanium oxide layer P21 by a gas-phase deposition method, and a silicon oxide layer formation step (1c) of forming a silicon oxide layer P22.

Base Material Preparation Step

In this step, a base material P1 is prepared (1a).

As the base material P1, a material described above can be used, however, a material subjected to a pretreatment such as a washing treatment or a lyophilization treatment may be used. Further, as the pretreatment, a mask may be formed in a region where the antireflection film P2 is not desired to be formed. In this case, as a post-treatment, a mask removal step may be included.

Titanium Oxide Layer Formation Step

In this step, a titanium oxide layer P21 is formed by a gas-phase deposition method (1b).

Examples of the gas-phase deposition method which can be adopted in this step include chemical vapor deposition (CVD) methods such as thermal CVD, plasma CVD, and laser CVD, vacuum vapor deposition, sputtering, ion beam-assisted vapor deposition, and ion plating. By using such a gas-phase deposition method, the light transmittance can be made particularly excellent.

In particular, from the viewpoint that the configuration of a deposition device is relatively simple, and the titanium oxide layer P21 having stable properties can be formed, ion beam-assisted vapor deposition is preferred.

In the case where the formation of the titanium oxide layer P21 is performed by ion beam-assisted vapor deposition, as a vapor deposition source, for example, a material containing, a composite oxide of titanium and the above-described element (at least one element selected from the group consisting of Nb, Si, Zr, Ta, Al, and Hf as the accessory component) may be used, however, a material containing titanium oxide and an oxide of the above-described element may be used.

According to this, a material (vapor deposition source) for forming the titanium oxide layer P21 can be prepared as a relatively inexpensive material. Further, the adjustment of the ratio of titanium (Ti) to the above-described element, or the like can be easily and reliably performed, and thus, the titanium oxide layer P21 having a desired composition can be easily and reliably formed.

The above-described element may be an element which is in the form other than an oxide in the vapor deposition source.

In the case where this step is performed by ion beam-assisted vapor deposition, this step may be performed by using multiple types of vapor deposition sources. For example, a vapor deposition source containing titanium oxide (a first vapor deposition source) and a vapor deposition source containing the above-described element (a second vapor deposition source having a higher content of the above-described element than the first vapor deposition source) may be used in combination.

According to this, the occurrence of an undesired variation in the composition of the titanium oxide layer P21 to be formed due to a difference in ease of evaporation of the multiple types of components to be used in the formation of the titanium oxide layer P21, or the occurrence of an undesired variation in the properties among individual components when multiple optical components P10 are produced can be more reliably prevented. Further, by adjusting the heating conditions or the like in this step (for example, the heating temperature for at least one vapor deposition source is changed over time, or the like), the composition of the titanium oxide layer P21 to be formed can be changed (for example, changed gradiently) along the thickness direction or the like.

In the case where this step is performed by, for example, sputtering, the same effect as described above is obtained also when multiple types of targets are used.

Silicon Oxide Layer Formation Step

In this step, the silicon oxide layer P22 is formed on the base material P1 (1c).

This step may be performed by any method, however, in the case where the silicon oxide layer P22 is formed as a dense layer, for example, a gas-phase deposition method such as a chemical vapor deposition (CVD) method (such as thermal CVD, plasma CVD, and laser CVD), vacuum vapor deposition, sputtering, ion beam-assisted vapor deposition, or ion plating can be favorably used. By using such a gas-phase deposition method, the light transmittance can be made particularly excellent.

In particular, from the viewpoint that the configuration of a deposition device is relatively simple, and the silicon oxide layer P22 having stable properties can be formed, ion beam-assisted vapor deposition is preferred.

In the case where the silicon oxide layer P22 is formed as a layer containing silica particles, in this step, a composition for forming silicon oxide layer containing silica particles and a dispersion medium for dispersing the silica particles can be favorably used.

In the case where the antireflection film includes multiple layers of at least one of the titanium oxide layer P21 and the silicon oxide layer P22, the above-described steps (the titanium oxide layer formation step and the silicon oxide layer formation step) may be performed repeatedly. For example, in the case where the antireflection film P2 has a structure in which the silicon oxide layer P22 and the titanium oxide layer P21 are alternately stacked on each other as shown in FIG. 2, the silicon oxide layer formation step and the titanium oxide layer formation step may be alternately performed repeatedly.

According to the production method as described above, an optical component including an antireflection film having an excellent antireflection function can be efficiently produced.

Timepiece

Next, a timepiece according to the invention will be described.

The timepiece according to the invention includes the optical component according to the invention as described above.

According to this, a timepiece capable of favorably visually recognizing a state on a rear surface side of the optical component can be provided, and the aesthetic appearance (aestheticity) of the timepiece as a whole can be made excellent, and thus, the value as an ornament can be increased. Further, for example, the visibility of the time and the like can be improved, and therefore, also the function (practicality) as a daily necessity becomes excellent. Further, a timepiece including the optical component having an excellent antistatic function while having sufficient light transmittance can be provided, and for example, a timepiece in which the occurrence of an adverse effect of static electricity is effectively prevented can be provided, and thus, the reliability of the timepiece as a whole can be made high.

The timepiece according to the invention may be any as long as it includes the optical component according to the invention as at least one optical component, and as the other components, known components can be used, however, hereinafter, one example of the configuration of the timepiece when the optical component according to the invention is applied to the cover glass will be representatively described.

Figure 3:
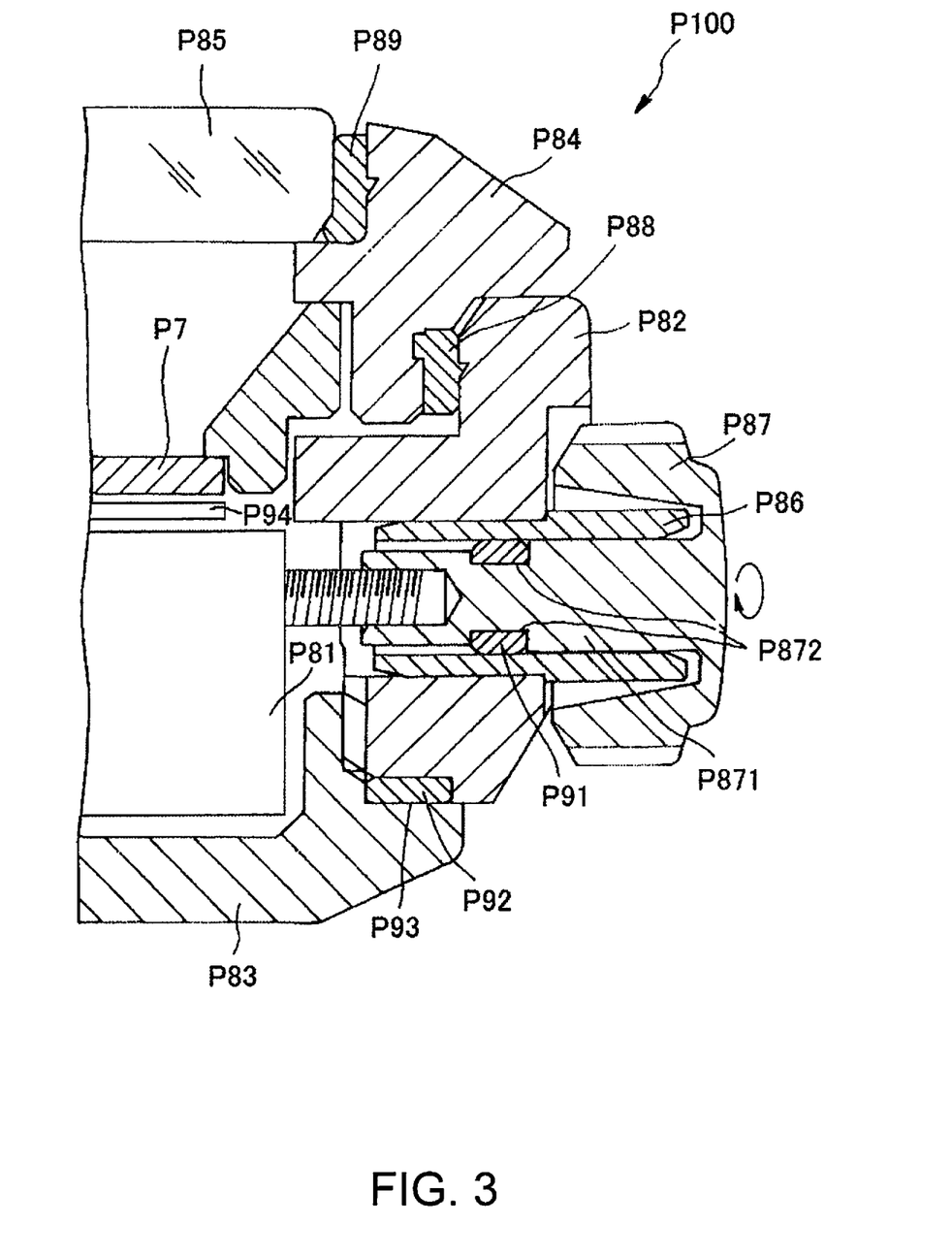
FIG. 3 is a partial cross-sectional view showing a preferred embodiment of a timepiece (portable timepiece) according to the invention.

FIG. 3 is a partial cross-sectional view showing a preferred embodiment of the timepiece (portable timepiece) according to the invention.

As shown in FIG. 3, a wristwatch (portable timepiece) P100 of this embodiment includes a barrel (case) P82, a rear lid P83, a bezel (frame) P84, and a cover glass (a cover glass for a timepiece) P85. In the case P82, a dial plate for a timepiece (a dial plate) P7, a solar cell P94, and a movement P81 are housed, and further, hands (indicator hands) not shown in the drawing and the like are also housed.

The cover glass P85 is composed of the optical component according to the invention as described above.

According to this, the visibility of the dial plate P7, the hands (indicator hands), and the like can be enhanced. Further, the dial plate P7 and the like are members which have a large influence on the appearance of the entire timepiece, however, undesirable light reflection is prevented when the dial plate P7 and the like are visually recognized, and therefore, the aesthetic appearance (aestheticity) of the watch as a whole can be made particularly excellent.

The movement P81 drives the indicator hands by utilizing the electromotive force of the solar cell P94.

Although not shown in FIG. 3, in the movement P81, for example, an electric double-layer capacitor which stores the electromotive force of the solar cell P94, a lithium ion secondary buttery, a crystal oscillator as a time reference source, a semiconductor integrated circuit which generates a driving pulse for driving the watch based on the oscillation frequency of the crystal oscillator, a step motor for driving the indicator hands every second by receiving this driving pulse, a gear train mechanism for transmitting the movement of the step motor to the indicator hands, and the like are included.

Further, the movement P81 includes an antenna for receiving a radio wave (not shown), and has a function to perform time adjustment and the like using the received radio wave.

The solar cell P94 has a function to convert light energy into electrical energy. The electrical energy converted by the solar cell P94 is utilized for driving the movement P81 or the like.

The solar cell P94 has, for example, a PIN structure in which a p-type impurity and an n-type impurity are selectively introduced into a non-single crystal silicon thin film, and further, an i-type non-single crystal silicon thin film having a low impurity concentration is provided between a p-type non-single crystal silicon thin film and an n-type non-single crystal silicon thin film.

In the barrel P82, a winding stem pipe P86 is fitted and fixed, and in this winding stem pipe P86, a shaft P871 of a stem P87 is rotatably inserted.

The barrel P82 and the bezel P84 are fixed to each other with a plastic packing P88, and the bezel P84 and the cover glass P85 are fixed to each other with a plastic packing P89.

With the barrel P82, the rear lid P83 is fitted (or threadedly engaged), and in a bonding portion (seal portion) P93 of these members, a ring-shaped rubber packing (rear lid packing) P92 is inserted in a compressed state. According to this configuration, the seal portion P93 is sealed in a liquid-tight manner, whereby a water-proof function is obtained.

A groove P872 is formed in a middle part on an outer periphery of the shaft P871 of the stem P87, and in this groove P872, a ring-shaped rubber packing (stem packing) P91 is fitted. The rubber packing P91 is in close contact with the inner peripheral surface of the winding stem pipe P86 and compressed between the inner peripheral surface and the inner surface of the groove P872. According to this configuration, liquid-tight sealing is provided between the stem P87 and the winding stem pipe P86, so that a water-proof function is obtained. Incidentally, when the stem P87 is rotated, the rubber packing P91 rotates along with the shaft P871 and slides in the circumferential direction while being in close contact with the inner peripheral surface of the winding stem pipe P86.

In the above description, as one example of the timepiece, a timepiece including a cover glass as the optical component according to the invention is described, however, the timepiece according to the invention may be a timepiece including, for example, a component to which the optical component according to the invention is applied as the component other than the cover glass. For example, the rear lid or the like may be one composed of the optical component according to the invention. According to this, the effect as described above is obtained, and also the aesthetic appearance (aestheticity) of the timepiece as a whole can be improved.

Further, in the above description, as one example of the timepiece, a wristwatch (portable timepiece) as a solar radio timepiece is described, however, the invention can be also applied to other types of a timepiece such as a portable timepiece other than wristwatches, table clocks, and wall clocks in the same manner. Further, the invention can be also applied to any timepieces such as solar timepieces other than solar radio timepieces and radio timepieces other than solar radio timepieces.

Hereinabove, preferred embodiments of the invention are described, however, the invention is not limited to those described above.

For example, in the optical component and the timepiece according to the invention, the configuration of each part can be replaced with an arbitrary configuration exhibiting a similar function, and also an arbitrary configuration can be added.

For example, the optical component may include a protective film or the like in addition to the base material and the antireflection film. Further, the optical Component may include a foundation layer between the base material and the antireflection film.

Further, the optical component according to the invention may include multiple antireflection films. For example, in the above-described embodiment, a case where the antireflection film is provided on one surface side of the base material is described, however, the antireflection film may be provided on both surface sides of the base material. Further, the optical component may have a configuration in which multiple antireflection films are stacked on one another through an intermediate layer.

In the above embodiment, a case where the antireflection film is composed of a titanium oxide layer and a silicon oxide layer is representatively described, however, in the invention, the antireflection film may include a constituent member other than a titanium oxide layer and a silicon oxide layer. For example, the antireflection film may include an intermediate layer provided between a titanium oxide layer and a silicon oxide layer.

Further, in the above-described embodiment, a case where the optical component according to the invention is used as a constituent component of a timepiece is mainly described, however, the optical component according to the invention is not limited to an optical component to be used as a constituent component of a timepiece, and may be an optical component to be applied to, for example, various electrical devices including optical devices such as cameras (including video cameras, cameras mounted on cellular phones (including smart phones, PHS, etc.), and the like) and projectors, optical measurement devices such as microscopes, and the like, and also to eyeglasses, loupes, and the like. Further, the optical component according to the invention is not limited to an optical component to be used in combination with another member, and may be an optical component to be used alone as it is.

Further, in the production of the optical component according to the invention, other than the above-described steps, according to need, a pretreatment step, an intermediate treatment step, and a post-treatment step may be performed. For example, prior to the formation of the antireflection film on the base material, a step of performing a UV irradiation, plasma irradiation, or the like on the surface of the base material may be included. According to this, for example, the adhesiveness between the base material and the antireflection film is made particularly excellent, and thus, the durability and reliability of the optical component can be made particularly excellent.

Further, the optical component according to the invention is not limited to those produced using the above-described method. For example, in the above-described embodiment, a case where the titanium-oxide layer is formed by a gas-phase deposition method is representatively described, however, the titanium oxide layer may be formed by using, for example, a wet process such as a coating method.

EXAMPLES

Next, specific examples of the invention will be described.

1. Production of Optical Component (Cover Glass)

Example 1

By the method as described below, a cover glass as an optical component was produced.

First, a plate material (glass plate) composed of a sapphire glass was prepared as a base material (the base material preparation step), and a necessary part was cut and polished. The base material obtained by cutting and polishing had a substantially disk shape and had a size of 30 mm in diameter and 1 mm in thickness.

Subsequently, a UV irradiation treatment in which an ultraviolet ray with a wavelength of 248 nm was irradiated on the surface of the base material on the side where an antireflection film was going to be formed.

Subsequently, by ion beam-assisted vapor deposition using a mixture of titanium oxide ($TiO_2$) and niobium oxide ($Nb_2O_5$) as a vapor deposition source, a titanium oxide layer was formed on the base material (the titanium oxide layer formation step), whereby a cover glass was obtained as an optical component. The formed titanium oxide layer had a thickness of 100 nm, and in the titanium oxide layer, the content of titanium (Ti) was 59.75 mass %, the content of niobium (Nb) was 0.21 mass %, and the content of oxygen (O) was 40.04 mass %.

Subsequently, by ion beam-assisted vapor deposition using silicon dioxide ($SiO_2$) as a vapor deposition source, a silicon oxide layer was formed on the base material (the silicon oxide layer formation step). The formed silicon oxide layer was composed of silicon dioxide ($SiO_2$) and had a thickness of 85 nm.

Examples 2 to 5

Optical components (cover glasses) were produced in the same manner as in the above Example 1 except that the configurations of the respective parts of the optical components were changed as shown in Table 1 by adjusting the treatment time of ion beam-assisted vapor deposition in the silicon oxide layer formation step and the conditions for ion beam-assisted vapor deposition in the titanium oxide layer formation step (including the composition of the vapor deposition source).

Example 6

An optical component (cover glass) was produced in the same manner as in the above Example 1 except that the configuration of the optical component was changed as shown in Table 1 by repeatedly performing the silicon oxide layer formation step and the titanium oxide layer formation step.

Examples 7 to 12

Optical components (cover glasses) were produced in the same manner as in the above Example 6 except that the configurations of the respective parts of the optical components were changed as shown in Table 1 by adjusting the number of repetitions of the silicon oxide layer formation step and the titanium oxide layer formation step, the treatment time of ion beam-assisted vapor deposition in each silicon oxide layer formation step, and the conditions for ion beam-assisted vapor deposition in each titanium oxide layer formation step (including the composition of the vapor deposition source).

Comparative Example 1

An optical component (cover glass) was produced in the same manner as in the above Example 1 except that the base material (the plate material composed of a sapphire glass) was directly used as the optical component without forming an antireflection film on the base material.

Comparative Example 2

By the method as described below, a cover glass as an optical component was produced.

First, a plate material (glass plate) composed of a sapphire glass was prepared as a base material (the base material preparation step), and a necessary part was cut and polished. The base material obtained by cutting and polishing had a substantially disk shape and had a size of 30 mm in diameter and 1 mm in thickness.

Subsequently, a UV irradiation treatment in which an ultraviolet ray with a wavelength of 248 nm was irradiated on both surfaces of the base material.

Subsequently, by using $SiO_2$ and $SiN_x$ as a target, deposition was performed by sputtering in the order of $SiN_x$, $SiO_2$, $SiN_x$, and $SiO_2$ on the entire area of one surface of the base material (a first surface), an antireflection film having a four-layer structure was formed. The thicknesses of the respective layers were 40 nm, 20 nm, 70 nm, and 100 nm, respectively, from the side closer to the base material. Further, the refractive index of $SiN_x$ was 1.97. At this time, when the outermost layer was formed, $O_2$ gas and $N_2$ gas were mixed and introduced such that the value of the gas flow ratio of $N_2$ gas to the sum of the $O_2$ gas and the $N_2$ gas (hereinafter referred to as "gas flow ratio") $N_2/(N_2+O_2)$ was 50%. By doing this, N was introduced into the outermost layer at 0.1 at %. Thereafter, the base material was turned over, and a second surface, which is the opposite surface to the first surface, was subjected to the same treatment as performed for the first surface, whereby an antireflection film having a four-layer structure in which $SiN_x$, $SiO_2$, $SiN_x$, and $SiO_2$ layers were stacked in this order was formed. The thicknesses of the respective layers were 40 nm, 20 nm, 70 nm, and 100 nm, respectively, from the side closer to the base material.

As described above, an optical component (cover glass) having the antireflection films formed on both surfaces of the base material was obtained.

Comparative Example 3

An optical component (cover glass) was produced in the same manner as in the above Example 1 except that the titanium oxide layer which is composed of $TiO_2$ and does not contain the above-described element was formed by using titanium oxide ($TiO_2$) as the vapor deposition source in the titanium oxide layer formation step.

Comparative Example 4

An optical component (cover glass) was produced in the same manner as in the above Example 1 except that a layer which is composed of niobium oxide ($Nb_2O_5$) and does not contain Ti was formed in place of the titanium oxide layer by using niobium oxide ($Nb_2O_5$) as the vapor deposition source in the titanium oxide layer formation step.

Comparative Example 5

An optical component (cover glass) was produced in the same manner as in the above Example 1 except that a film composed of a polymeric organic material was formed using an anionic surfactant in place of the formation of the silicon oxide layer and the titanium oxide layer.

The configurations of the respective parts of the optical components (cover glasses) of the respective Examples and Comparative Examples are shown in Table 1. In Table 1, in the column "Arrangement order and thicknesses of respective layers", the arrangement order and the thicknesses of the respective layers are shown in the order from the side in contact with the base material to the side of the surface of the optical component, and the thicknesses of the respective layers are shown in the parentheses. Further, in the column "Arrangement order and thicknesses of respective layers", the titanium oxide layer is represented by "T", the silicon oxide layer is represented by "S", the layer composed of $SiN_x$ is represented by "SN", the layer composed of $Nb_2O_5$ is represented by "N", and the layer (film) composed of the polymeric organic material is represented by "0". Further, in Table 1, with respect to Comparative Example 4, the conditions for the layer which is composed of $Nb_2O_5$ and does not contain Ti are shown in the column of "Titanium oxide layer". Further, with respect to Examples 6 to 12, the multiple titanium oxide layers constituting the same optical component all have the same composition, and also the multiple silicon oxide layers constituting the same optical component all have the same composition.

TABLE 1

| | Base material Constituent material | Antireflection film | | | |
|---|---|---|---|---|---|
| | | Titanium oxide layer | | Silicon oxide layer Constituent material | Arrangement order and thicknesses [nm] of respective layers |
| | | Constituent material | Composition | | |
| Example 1 | Sapphire glass | Composite oxide of Ti and Nb | Ti-59.75/Nb-0.21/O-40.04 | $SiO_2$ | T(100)/S(85) |
| Example 2 | Sapphire glass | Composite oxide of Ti and Nb | Ti-59.33/Nb-0.70/O-39.97 | $SiO_2$ | T(100)/S(85) |
| Example 3 | Sapphire glass | Composite oxide of Ti and Nb | Ti-59.90/Nb-0.03/O-40.06 | $SiO_2$ | T(100)/S(85) |
| Example 4 | Sapphire glass | Composite oxide of Ti and Ta | Ti-59.75/Ta-0.25/O-40.00 | $SiO_2$ | T(100)/S(85) |
| Example 5 | Sapphire glass | Composite oxide of Ti and Zr | Ti-59.76/Zr-0.22/O-40.02 | $SiO_2$ | T(100)/S(85) |
| Example 6 | Sapphire glass | Composite oxide of Ti and Nb | Ti-59.75/Nb-0.21/O-40.04 | $SiO_2$ | S(150)/T(10)/S(25)/T(95)/S(85) |
| Example 7 | Sapphire glass | Composite oxide of Ti and Nb | Ti-59.90/Nb-0.03/O-40.06 | $SiO_2$ | S(150)/T(10)/S(25)/T(95)/S(85) |
| Example 8 | Sapphire glass | Composite oxide of Ti and Ta | Ti-59.75/Ta-0.25/O-40.00 | $SiO_2$ | S(150)/T(10)/S(25)/T(95)/S(85) |
| Example 9 | Sapphire glass | Composite oxide of Ti and Zr | Ti-59.76/Zr-0.22/O-40.02 | $SiO_2$ | S(150)/T(10)/S(25)/T(95)/S(85) |
| Example 10 | Sapphire glass | Composite oxide of Ti and Nb | Ti-59.75/Nb-0.21/O-40.04 | $SiO_2$ | S(30)/T(20)/S(30)/T(110)/S(85) |
| Example 11 | Sapphire glass | Composite oxide of Ti and Nb | Ti-59.75/Nb-0.21/O-40.04 | $SiO_2$ | T(15)/S(20)/T(110)/S(90) |
| Example 12 | Sapphire glass | Composite oxide of Ti and Nb | Ti-59.75/Nb-0.21/O-40.04 | $SiO_2$ | S(35)/T(10)/S(105)/T(10)/ S(35)/T(100)/S(85) |

TABLE 1-continued

| | Base material Constituent material | Antireflection film | | | |
|---|---|---|---|---|---|
| | | Titanium oxide layer | | Silicon oxide layer Constituent material | Arrangement order and thicknesses [nm] of respective layers |
| | | Constituent material | Composition | | |
| Comparative Example 1 | Sapphire glass | — | — | — | — |
| Comparative Example 2 | Sapphire glass | — | — | SiO$_2$ | SN(40)/S(20)/SN(70)/S(100) |
| Comparative Example 3 | Sapphire glass | TiO$_2$ | Ti-59.94/O-40.06 | SiO$_2$ | T(100)/S(85) |
| Comparative Example 4 | Sapphire glass | Nb$_2$O$_5$ | Nb-74.38/O-25.62 | SiO$_2$ | N(110)/S(85) |
| Comparative Example 5 | Sapphire glass | — | — | — | O(10) |

2. Evaluation of Reflectance

With respect to each of the cover glasses produced in the above respective Examples and Comparative Examples, the light reflectance from the cover glass was measured using a reflectometer USPM manufactured by Olympus Corporation from the side of the surface of the base material opposite to the surface provided with the antireflection film, and evaluation was performed according to the following criteria. Incidentally, in the case of Comparative Example 1, the antireflection film is not provided on both surfaces, and in the case of Comparative Example 2, the antireflection film is provided on both surfaces, and therefore, with respect to these Comparative Examples, evaluation was performed for arbitrarily selected one surface (the same shall apply also to the following evaluation items).

A: The light reflectance is less than 0.3%.
B: The light reflectance is 0.3% or more and less than 0.5%.
C: The light reflectance is 0.5% or more and less than 1.0%.
D: The light reflectance is 1.0% or more and less than 4.0%.
E: The light reflectance is 4.0% or more.

3. Evaluation of Antistatic Property

A probe was brought into contact with the surface on the side provided with the antireflection film of each of the cover glasses produced in the above respective Examples and Comparative Examples, and the surface electrical resistance was measured using a surface resistance meter (Hiresta-UP MCP-HT45 manufactured by Mitsubishi Chemical Corporation), and evaluation was performed according to the following criteria. It can be said that as the surface electrical resistance is lower, the antistatic property is superior. The measurement was performed under the following environment: temperature: 25° C. and humidity: 55% RH.

A: The surface electrical resistance is less than 1E+8 Ω/□.
B: The surface electrical resistance is 1E+8Ω/□ or more and less than 1E+9 Ω/□.
C: The surface electrical resistance is 1E+9Ω/□ or more and less than 1E+11 Ω/□.
D: The surface electrical resistance is 1E+11Ω/□ or more and less than 1E+15 Ω/□.
E: The surface electrical resistance is 1E+15Ω/□ or more.

4. Evaluation of Antifogging Property

The antifogging property evaluation index when saturated water vapor was sprayed onto the surface on the side provided with the antireflection film of each of the cover glasses produced in the above respective Examples and Comparative Examples was obtained by using an antifogging property evaluation device (AFA-1 manufactured by Kyowa Interface Science Co., Ltd.), and evaluation was performed according to the following criteria. It can be said that as the antifogging property evaluation index is lower, the antifogging property is superior.

A: The antifogging property evaluation index is less than 3.
B: The antifogging property evaluation index is 3 or more and less than 6.
C: The antifogging property evaluation index is 6 or more and less than 10.
D: The antifogging property evaluation index is 10 or more and less than 20.
E: The antifogging property evaluation index is 20 or more.

5. Evaluation of Adhesiveness

Five horizontal cut lines at 2-mm intervals and five vertical cut lines at 2-mm intervals were provided on the surface to be evaluated with a cutter, and an adhesive tape (CT-18 manufactured by Nichiban Co., Ltd.) was adhered thereto, and thereafter, the adhesive tape was peeled off at a stroke. Then, it was confirmed whether or not peeling occurred on the surface to be evaluated by visual observation, and evaluation was performed according to the following criteria.

A: No film peeling is observed.
B: The film peeling area is less than 5%.
C: The film peeling area is 5% or more and less than 20%.
D: The film peeling area is 20% or more and less than 50%.
E: The film peeling area is 50% or more.

6. Evaluation of Abrasion Resistance

An abrasion resistance test using silbon paper as a counter paper was performed according to JIS K5701 for the surface on the side provided with the antireflection film of each of the cover glasses produced in the above respective Examples and Comparative Examples. Then, the cover glass after the abrasion resistance test was visually observed, and evaluation was performed according to the following criteria.

A: No scratches by rubbing occur.
B: Scratches by rubbing hardly occur.

C: Scratches by rubbing slightly occur.
D: Scratches by rubbing clearly occur.
E: Scratches by rubbing remarkably occur.

7. Production of Timepiece

By using each of the cover glasses produced in the above respective Examples and Comparative Examples, wristwatches as shown in FIG. 3 were produced. At this time, the surface on the side provided with the antireflection film of the cover glass was disposed facing the inner surface side (a side facing the dial plate and the like).

8. Evaluation of Visibility of Dial Plate of Timepiece

With respect to each of the timepieces produced in the above respective Examples and Comparative Examples, the dial plate and the like were observed through the cover glass, and the visibility at that time was evaluated according to the following criteria.

A: The visibility of the dial plate and the like is very high.
B: The visibility of the dial plate and the like is high.
C: The visibility of the dial plate and the like is within the acceptable range.
D: The visibility of the dial plate and the like is somewhat low.
E: The visibility of the dial plate and the like is very low.

These results are shown in Table 2.

TABLE 2

|  | Reflectance | Antistatic property | Antifogging property | Adhesiveness | Abrasion resistance | Visibility of dial plate |
| --- | --- | --- | --- | --- | --- | --- |
| Example 1 | B | B | B | A | A | B |
| Example 2 | B | B | B | A | A | B |
| Example 3 | B | B | B | A | A | B |
| Example 4 | B | B | B | B | A | B |
| Example 5 | B | B | B | B | A | B |
| Example 6 | A | A | A | A | A | A |
| Example 7 | A | A | A | A | A | A |
| Example 8 | A | A | B | B | A | A |
| Example 9 | A | A | B | B | A | A |
| Example 10 | A | A | A | A | A | A |
| Example 11 | A | A | A | B | A | A |
| Example 12 | A | A | A | A | A | A |
| Comparative Example 1 | E | E | E | — | A | E |
| Comparative Example 2 | B | E | E | A | A | B |
| Comparative Example 3 | B | D | E | A | A | B |
| Comparative Example 4 | B | D | E | A | A | B |
| Comparative Example 5 | E | E | A | D | D | E |

As apparent from Table 2, according to the invention, the optical component had a high antireflection function and also had excellent antistatic property, antifogging property, abrasion resistance, and the like. Further, the timepieces including the optical component had high visibility of the dial plate and the like, and the aesthetic appearance (aestheticity) of the timepiece as a whole was excellent. On the other hand, in the case of Comparative Examples, satisfactory results were not obtained.

When timepieces were produced in the same manner as in the above respective Examples and Comparative Examples except that in addition to the cover glass, also the rear lid was formed to have the same configuration as described above, the same results as described above were obtained, and the aesthetic appearance (aestheticity) of the timepieces to which the optical component according to the invention was applied (timepieces according to the invention) could be made particularly excellent.

The entire disclosure of Japanese Patent Application No. 2014-242176, filed Nov. 28, 2014 is expressly incorporated by reference herein.

What is claimed is:

1. An optical component comprising:
a base material; and
an antireflection film, which includes a titanium oxide layer composed mainly of a complex oxide of titanium and niobium, and a silicon oxide layer composed mainly of silicon oxide,
the content of the niobium in the titanium oxide layer being 0.01 mass % or more and 1.0 mass % or less the antireflection film being a stacked body including multiple layers of each of the titanium oxide layer and the silicon oxide layer.

2. The optical component according to claim 1, wherein the thickness of the titanium oxide layer is 5 nm or more and 200 nm or less.

3. The optical component according to claim 1, wherein the thickness of the silicon oxide layer is 15 nm or more and 300 nm or less.

4. The optical component according to claim 1, wherein the thickness of the antireflection film is 20 nm or more and 500 nm or less.

5. The optical component according to claim 1, wherein the base material is composed of a material containing at least one member selected from the group consisting of a silicate glass, a sapphire glass, and a plastic.

6. The optical component according to claim 1, wherein the optical component is a cover glass for a timepiece.

7. A timepiece comprising the optical component according to claim 1.

8. A timepiece comprising the optical component according to claim 2.

9. A timepiece comprising the optical component according to claim 3.

10. A timepiece comprising the optical component according to claim 4.

11. A timepiece comprising the optical component according to claim 5.

12. A timepiece comprising the optical component according to claim 6.

13. A timepiece comprising:
   an optical component including
      a base material, and
      an antireflection film, which includes a titanium oxide layer composed mainly of a complex oxide of titanium and niobium, and a silicon oxide layer composed mainly of silicon oxide,
   the antireflection film being a stacked body including multiple layers of each of the titanium oxide layer and the silicon oxide layer the content of the niobium in the titanium oxide layer being 0.01 mass % or more and 1.0 mass % or less.

14. The timepiece according to claim 13, wherein the multiple layers of each of the titanium oxide layer and the silicon oxide layer in the antireflection film have a first silicon oxide layer directly disposed on the base material, and a first titanium oxide layer directly disposed on the first silicon oxide layer.

* * * * *

UNITED STATES PATENT AND TRADEMARK OFFICE
CERTIFICATE OF CORRECTION

PATENT NO. : 9,720,142 B2  
APPLICATION NO. : 14/863669  
DATED : August 1, 2017  
INVENTOR(S) : Daiki Furusato

Page 1 of 1

It is certified that error appears in the above-identified patent and that said Letters Patent is hereby corrected as shown below:

On the Title Page

Please add item [30] as:  
--[30] Foreign Application Priority Data  
Nov. 28, 2014 (JP).....................2014-24176--

Signed and Sealed this  
Thirtieth Day of October, 2018

Andrei Iancu  
*Director of the United States Patent and Trademark Office*